US010095998B2

(12) United States Patent
Richie et al.

(10) Patent No.: US 10,095,998 B2
(45) Date of Patent: Oct. 9, 2018

(54) SYSTEM AND METHOD FOR INCIDENT REPORTING AND NOTIFICATION

(71) Applicant: Shaleapps, LLC, Denver, CO (US)

(72) Inventors: James Chance Richie, Bloomfield Hills, MI (US); Adam M. Klenk, Morgantown, WV (US); Amanda Christides, Bloomfield Hills, MI (US)

(73) Assignee: HEP ShaleApps, LLC, Denver, CO (US)

( * ) Notice: Subject to any disclaimer, the term of this patent is extended or adjusted under 35 U.S.C. 154(b) by 0 days.

(21) Appl. No.: 14/950,176

(22) Filed: Nov. 24, 2015

(65) Prior Publication Data

US 2016/0335596 A1    Nov. 17, 2016

Related U.S. Application Data

(60) Provisional application No. 62/083,466, filed on Nov. 24, 2014.

(51) Int. Cl.
*G06Q 10/10* (2012.01)
*G06F 17/30* (2006.01)
*G01C 21/36* (2006.01)
*G01S 19/17* (2010.01)
*G08B 25/00* (2006.01)

(52) U.S. Cl.
CPC ......... *G06Q 10/10* (2013.01); *G01C 21/3676* (2013.01); *G01S 19/17* (2013.01); *G06F 17/30241* (2013.01); *G08B 25/00* (2013.01)

(58) Field of Classification Search
CPC ... G06Q 10/10; G06F 17/30241; G01S 19/13; G01S 19/17; G06K 19/0723; G06K 19/06028; G01C 21/3676; G08B 25/00
See application file for complete search history.

(56) References Cited

U.S. PATENT DOCUMENTS

| 8,934,015 B1* | 1/2015 | Chi | H04L 29/06476 348/158 |
| 2013/0332004 A1* | 12/2013 | Gompert | G07C 5/008 701/1 |
| 2014/0164390 A1* | 6/2014 | Hampapur | G06F 17/3087 707/743 |

* cited by examiner

*Primary Examiner* — Mussa A Shaawat
*Assistant Examiner* — Michael V Kerrigan
(74) *Attorney, Agent, or Firm* — The Webb Law Firm

(57) ABSTRACT

A system and method for incident reporting system includes at least one client device and at least one server computer. The at least one client device includes at least one processor, a camera unit, and a microphone, and is programmed or configured to generate location data for the at least one client device while the at least one client device is in a moving transportation vehicle; generate at least one user interface configured to receive incident data comprising at least one of the following: a location of an incident, a time of occurrence of an incident, a textual description of an incident, a party involved in an incident, or any combination thereof; capture and store at least one image of an incident with the camera unit; and automatically capture and store noise data with the microphone while the at least one client device is in the moving transportation vehicle.

19 Claims, 10 Drawing Sheets

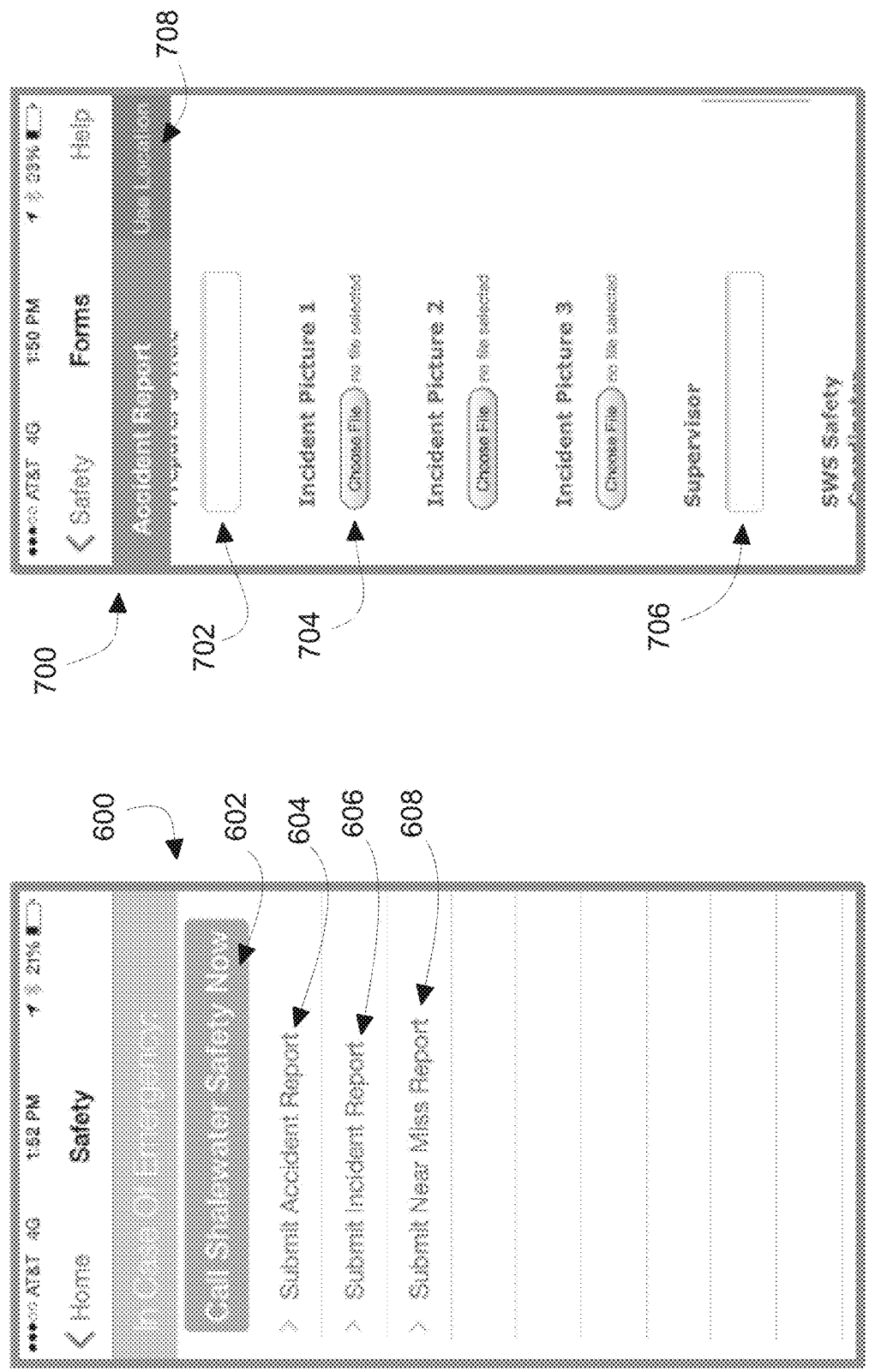

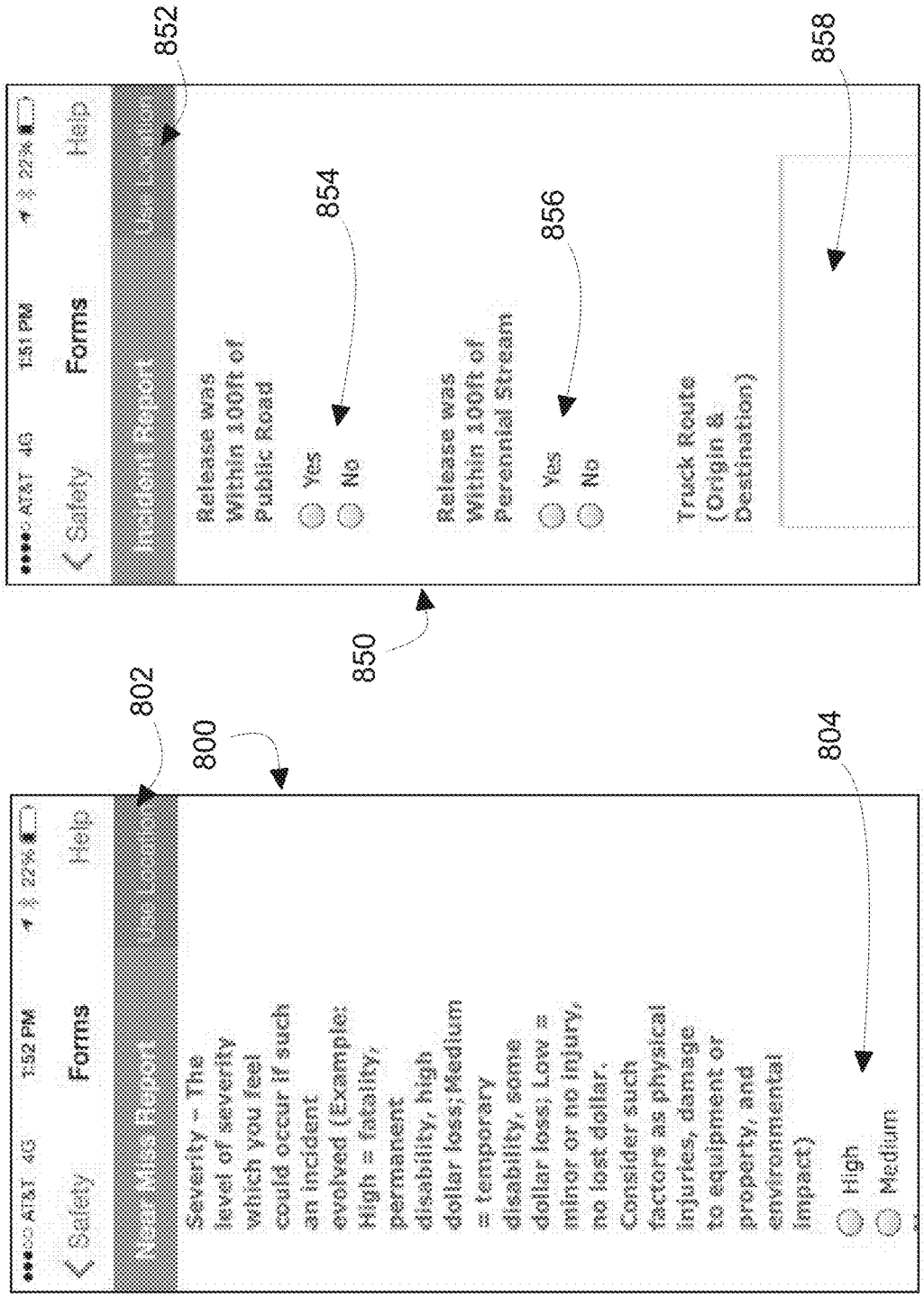

SYSTEM AND METHOD FOR INCIDENT REPORTING AND NOTIFICATION

CROSS REFERENCE TO RELATED APPLICATION

This application claims priority to U.S. Provisional Patent Application No. 62/083,466, filed Nov. 24, 2014, entitled "System and Method for Incident Reporting and Notification," the entire disclosure of which is herein incorporated by reference.

A portion of the disclosure of this patent document contains material which is subject to copyright protection. The copyright owner has no objection to the facsimile reproduction by anyone of the patent document or the patent document disclosure, as it appears in the Patent and Trademark Office patent file or records, but otherwise reserves all copyright rights whatsoever.

BACKGROUND OF THE INVENTION

Field of the Invention

This invention relates generally to material transportation and, more specifically, to a system and method for generating reports based on stored data and/or data relating to incidents.

Description of Related Art

The transportation of materials by vehicles, such as trucks, can be costly and involve many complications. The safe and efficient transportation of materials often requires monitoring incidents and reporting problems so that all relevant individuals are informed of important situations. When materials are continually transported, accidents can occur at any time for a variety of reasons. Accidents can involve vehicles (collisions, spills, near misses, etc.), individuals at site locations (slip-and-falls, mechanical issues, etc.), and/or equipment. When accidents occur, employees need to be notified of such situations so that they can avoid a problem area and/or not be involved in a similar situation.

SUMMARY OF THE INVENTION

Generally, the present invention provides an improved system and method for incident reporting and notification for use in transportation applications.

According to a preferred and non-limiting embodiment or aspect of the present invention, provided is an incident reporting system, comprising: at least one client device comprising at least one processor, a camera unit, and a microphone, the at least one client device programmed or configured to: generate location data for the at least one client device while the at least one client device is in a moving transportation vehicle; generate at least one user interface configured to receive incident data comprising at least one of the following: a location of an incident, a time of occurrence of an incident, a textual description of an incident, a party involved in an incident, or any combination thereof; capture and store at least one image of an incident with the camera unit; and automatically capture and store noise data with the microphone while the at least one client device is in the moving transportation vehicle; and at least one server computer in communication with the at least one client device and programmed or configured to: receive the location data, the incident data, the at least one image, and the noise data from the at least one client device; and generate at least one report based at least partially on the incident data and at least one of the following: the location data, the at least one image, the noise data, or any combination thereof.

According to another preferred and non-limiting embodiment or aspect of the present invention, provided is a computer-implemented method for incident reporting and notification, comprising: providing a client device in each vehicle of a plurality of vehicles transporting a material; generating, by at least one client device located in a vehicle of the plurality of vehicles, waypoint data representing a location of the vehicle; transmitting the waypoint data from the at least one client device to at least one server computer at predetermined intervals; generating, by the at least one server computer, a replay user interface based on the waypoint data received from the at least one client device over a period of time, the replay user interface comprising a route of the vehicle displayed on a map; generating, on the at least one client device, at least one incident reporting interface configured to receive incident data comprising at least one of the following: a location of an incident, a time of occurrence of an incident, a textual description of an incident, a party involved in an incident, or any combination thereof; capturing at least one image of an incident with a camera unit of the at least one client device; associating the at least one image with the incident data; and transmitting the incident data and the at least one image from the at least one client device to the at least one server computer.

According to a further preferred and non-limiting embodiment or aspect of the present invention, provided is a computer program product for reporting incidents experienced by a vehicle transporting a material, the computer program product comprising at least one non-transitory medium including program instructions that, when executed by a mobile device, cause the mobile device to: generate waypoint data representing a location of the vehicle at predetermined time intervals; transmit the waypoint data to at least one server computer; generate at least one incident reporting interface configured to receive incident data comprising at least one of the following: a location of an incident, a time of occurrence of an incident, a textual description of an incident, a party involved in an incident, or any combination thereof; capture at least one image of an incident with a camera unit of the client device; associate the at least one image with the incident data; transmit the incident data and the at least one image from the at least one client device to the at least one server computer; determine a volume level of an audible output of the client device; determine if the volume level is below a predefined threshold; and in response to determining that the volume level is below the predefined threshold, generating at least one alert.

According to a further preferred and non-limiting embodiment or aspect of the present invention, provided is an incident reporting and notification system, comprising: (a) at least one client device programmed or configured to: receive analyzed data, the analyzed data comprising at least one of the following: report data, graph data, map data, alert data, stored data, or any combination thereof; and transmit incident data, the incident data comprising at least one of the following: location of an incident, time of an incident, description of an incident, parties involved in an incident, comments from a user filling out an incident form, comments from parties involved in an incident, accident data, spill data, near miss data, or any combination thereof; and (b) at least one server computer in communication with the at least one client device, the at least one server computer programmed or configured to receive incident data from the at least one client device; store the incident data; and generate at least one report based at least partially on the incident data.

According to a further preferred and non-limiting embodiment or aspect of the present invention, provided is a computer-implemented method for incident reporting and notification, comprising the steps of: (a) obtaining incident data for at least one incident, the incident data comprising at least one of the following: location of an incident, time of an incident, description of an incident, parties involved in an incident, comments from a user filling out an incident form, comments from parties involved in an incident, accident data, spill data, near miss data, or any combination thereof; (b) transmitting, to at least one server computer, at least a portion of the incident data; and (c) receiving, on a mobile device, analyzed data, the analyzed data comprising at least one of the following: report data, graph data, map data, alert data, stored data, or any combination thereof.

According to a further preferred and non-limiting embodiment or aspect of the present invention, provided is a computer-implemented method for incident reporting and notification, comprising: (a) receiving incident data for at least one incident, the incident data comprising at least one of the following: location of an incident, time of an incident, description of an incident, parties involved in an incident, comments from a user filling out an incident form, comments from parties involved in an incident, accident data, spill data, near miss data, or any combination thereof; and (b) transmitting, to at least one client device, analyzed data, the analyzed data comprising at least one of the following: report data, graph data, map data, alert data, stored data, or any combination thereof.

These and other features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a", "an", and "the" include plural referents unless the context clearly dictates otherwise.

BRIEF DESCRIPTION OF THE DRAWINGS

FIG. 6 depicts a safety report user interface according to the principles of the present invention;

FIG. 7 depicts an accident report user interface according to the principles of the present invention;

FIG. 8 depicts a near-miss report user interface according to the principles of the present invention;

FIG. 9 depicts an incident report user interface according to the principles of the present invention;

DESCRIPTION OF THE INVENTION

Figure 1:
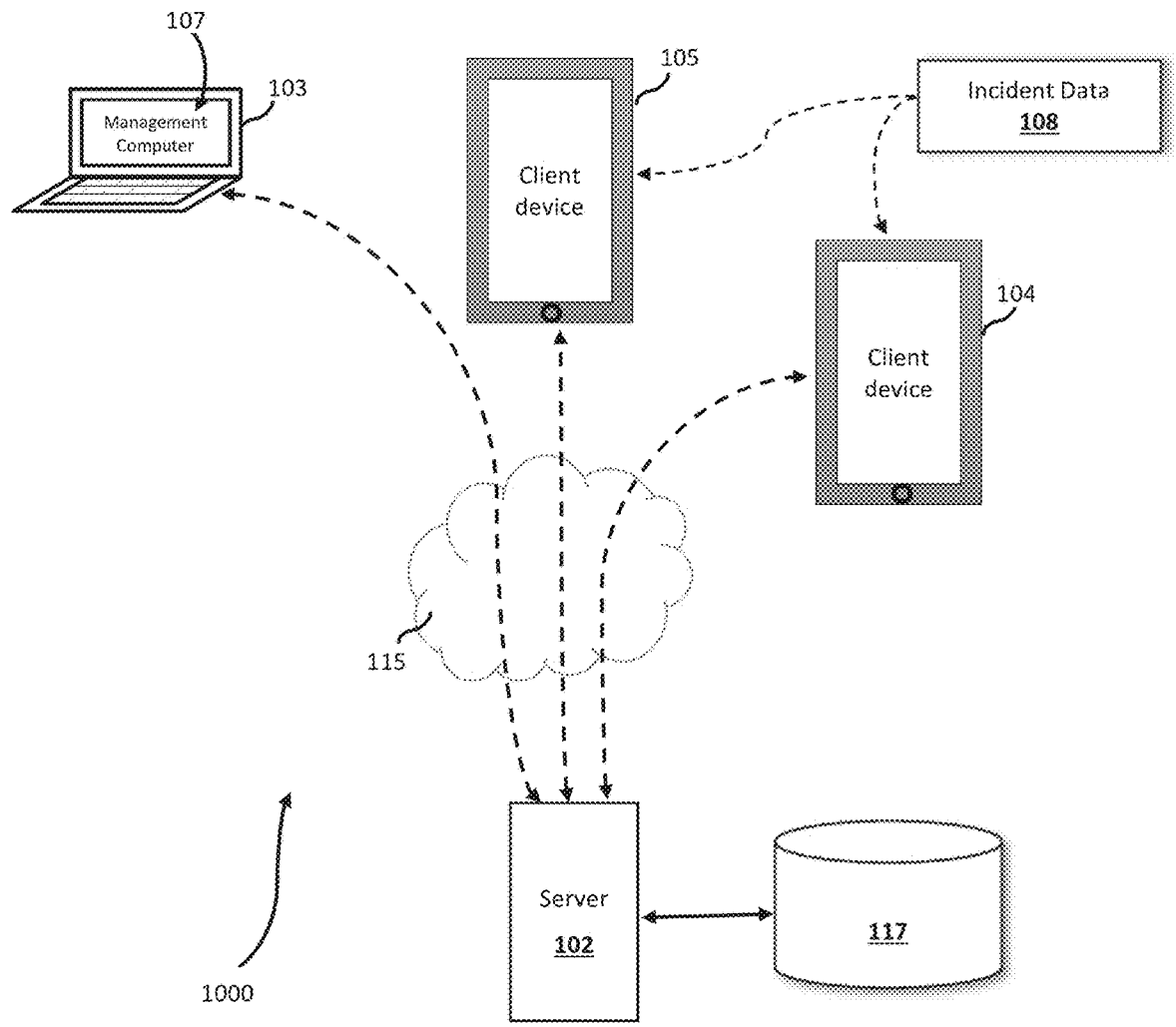
FIG. 1 is a schematic view of one embodiment or aspect of an incident reporting and notification system according to the principles of the present invention.

For purposes of the description hereinafter, the terms "end", "upper", "lower", "right", "left", "vertical", "horizontal", "top", "bottom", "lateral", "longitudinal", and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiment or aspects of the invention. Hence, specific dimensions and other physical characteristics related to the embodiments or aspects disclosed herein are not to be considered as limiting.

As used herein, the terms "communication" and "communicate" refer to the receipt or transfer of one or more signals, messages, commands, or other type of data. For one unit or device to be in communication with another unit or device means that the one unit or device is able to receive data from and/or transmit data to the other unit or device. A communication may use a direct or indirect connection, and may be wired and/or wireless in nature. Additionally, two units or devices may be in communication with each other even though the data transmitted may be modified, processed, routed, etc., between the first and second unit or device. For example, a first unit may be in communication with a second unit even though the first unit passively receives data, and does not actively transmit data to the second unit. As another example, a first unit may be in communication with a second unit if an intermediary unit processes data from one unit and transmits processed data to the second unit. It will be appreciated that numerous other arrangements are possible.

In one preferred and non-limiting embodiment of the present invention, an incident reporting and notification system comprises at least one client device and at least one server computer in communication with the at least one client device. The client device is programmed or configured to receive analyzed data and transmit incident data. The server computer is programmed or configured to receive incident data from the at least one client device, store the incident data, and generate at least one report based at least partially on the incident data.

Referring to FIG. 1, an incident reporting and notification system 1000 is shown according to a preferred and non-limiting embodiment or aspect. A server computer 102 is in communication with a management computer 103 and client devices 104, 105 through a network environment 115, such as the internet and/or a private network. The server computer 102 is also in communication with an incident management database 117, including incident data stored in one or more data structures on a data storage device. The management computer 103 displays a management interface 107 based at least partially on data received from the server computer 102 and/or the incident management database 117. The management interface 107 may be used to view and generate reports based on the incident data, as an example.

The term "management computer", as used herein, refers to any computing device capable of accessing the server computer and/or the incident management database. The management computer may include a client device used by an individual having administrative access or other credentials, as an example. In another example, the management computer may be a laptop and/or personal computer used for accessing the incident reporting and notification system 1000. The management computer may be in communication with the server computer through any number of protocols or methods, such as but not limited to an HTTP connection through a web browser or other software application installed on the management computer.

An "incident management database," as used herein, may refer to one or more data structures that include stored data, such as but not limited to incident data, report data, employee data, safety data sheets, National Institute for Occupational Safety and Health (NIOSH) guidelines, emergency response guidelines, company information, and/or company guidelines. The data structures may be distributed and/or centralized. For example, the incident management database 117 may include multiple data structures at one or many locations, or may include a single data structure. Further, the incident management database 117 may be any type of data structure, such as but not limited to delimiter-separated data, vectors, arrays, trees, tables, and/or the like.

As used herein, the terms "client device" and "client devices" refer to one or more hardware and/or software components that allow for user interaction and data transmission and/or receipt. In one preferred and non-limiting embodiment or aspect, the client devices are smartphones that have processing and display capabilities, and/or software applications that can run on such devices. However, it will be appreciated that a client device may be any mobile or portable computing device or components thereof. In a preferred and non-limiting embodiment or aspect, the client device includes a mobile client application that may include compiled program instructions programmed or configured to perform various tasks and display various interfaces when executed. One or more aspects of the mobile client application may also be executed by a remote computing device, such as the server computer, which then provides the client device with display data (such as in the form of a graphical user interface (GUI)) and receives input data from the client device.

With continued reference to FIG. 1, the client device 105 may be used to scan and/or otherwise receive incident data 108 from any number of data resources. Data resources may include, for example, visual indicia, radio frequency identification (RFID) transponders, memory devices, codes, wireless signals, data inputs, and/or the like. In one example, employee information, location coordinates, and/or sound level measurements may be obtained from data resources such as a matrix barcode or standard barcode, an RFID transponder, and/or a wireless signal. Comments from a user filling out an incident form, comments from parties involved in an incident, and/or employee information may be obtained from data resources including any type of printed or electronic data that is manually input into a client device 105, automatically input into a client device, or is otherwise read, scanned, and/or received by the client device 105.

In a further example, location coordinates and sound level measurements may be obtained from data resources including a computing device that transmits data to the client device 105 via near-field communication (NFC) methods and/or Bluetooth® protocols, or sensors that are local to or incorporated into the client device. In yet another example, the data resource may be printed data, which may include comments from a user filling out an incident form and comments from parties involved in an incident, which may be received by the client device 105 through any number of Optical Character Recognition (OCR) processes. It will be appreciated that other variations are possible. The client device 105 may also store all the received incident data 108 and/or other information locally and synchronize with the server computer 102 when a connection is available or at predefined intervals.

The term "incident data", as used herein, refers to data representing information related to an incident. Incidents may involve a variety of situations including accidents (on the road or at a site), spills, near-misses, and/or the like. The incident data may include the location of an incident, time of an incident, description of an incident, parties involved in an incident, comments from a user filling out an incident form, comments from parties involved in an incident, and/or the like. Additionally, in one preferred and non-limiting embodiment or aspect, the incident data may also include information from a Global Positioning System (GPS) receiver and/or information from a noise device that measures decibels. In a non-limiting embodiment or aspect, the noise device is used to measure noise data such as sound levels (e.g., A-weighted decibels). The noise device may include a microphone on a client device or an external device or sensor configured to measure and record sound levels. The incident data may also include sensor data such as, for example, data received from one or more accelerometers, gyroscopes, and/or other like sensors incorporated into the client device or in communication with the client device. Accelerometers may, for example, be used to detect hard braking events based on a detected force exceeding a predefined threshold or limit. However, it will be appreciated that various arrangements are possible.

Figure 2:
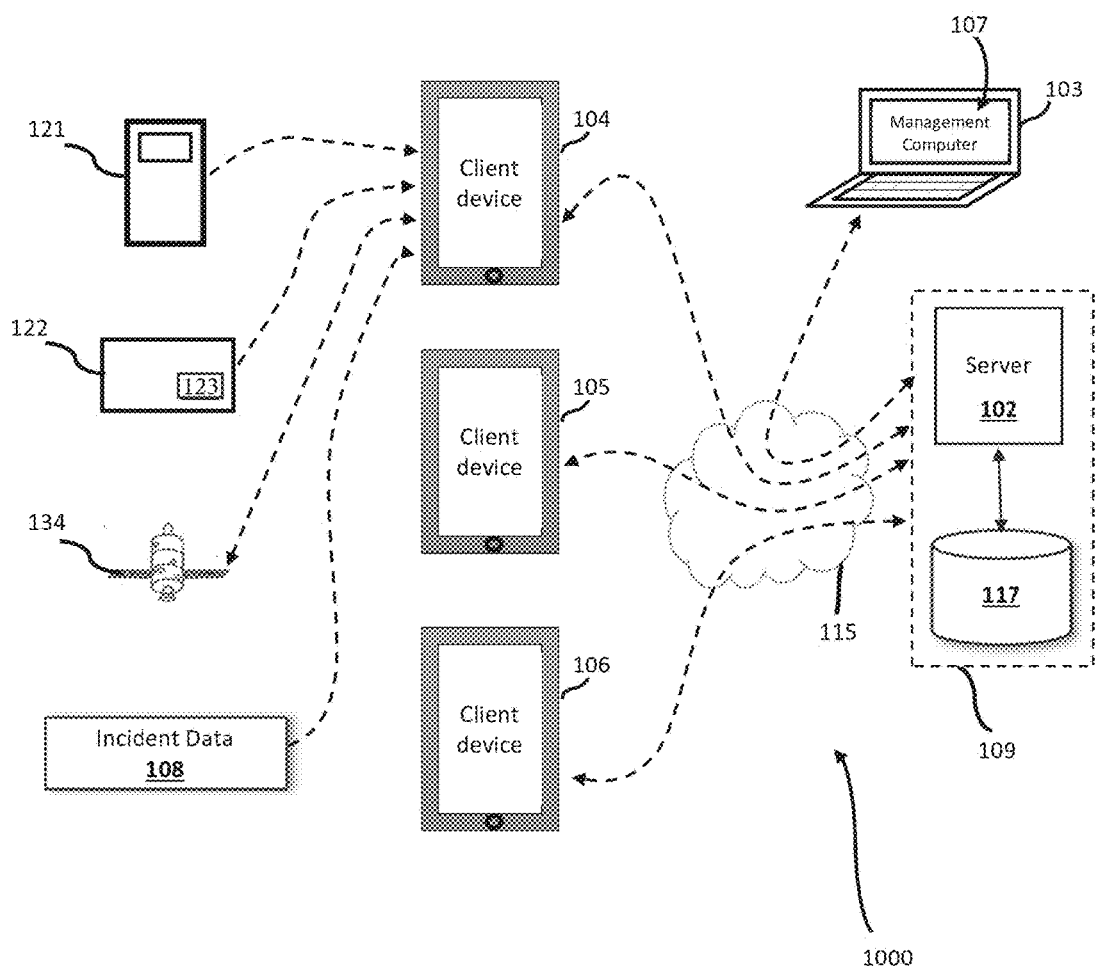
FIG. 2 is another schematic view of one embodiment or aspect of an incident reporting and notification system according to the principles of the present invention.

Referring now to FIG. 2, an incident reporting and notification system 1000 is shown according to another preferred and non-limiting embodiment or aspect. An incident management host 109 includes a server computer 102 and an incident management database 117. It will be appreciated that, as already explained, the incident management database 117 may be local to the server computer 102, client devices 104, 105, 106, and/or remotely hosted. The server computer 102 and host 109 are in communication with a management computer 103 and client devices 104, 105, 106 through a network environment 115, such as the internet, a wide-area network (WAN), or other form of communication. The client devices 104, 105, 106 are programmed or configured to receive incident data 108, noise data from a noise device 121 that measures decibels, employee data from an employee identification card 122, and/or location data from a Global Positioning System (GPS) satellite 134.

With continued reference to FIG. 2, in a preferred and non-limiting embodiment or aspect, an employee has an identification (ID) card 122 on their person. The ID card 122 contains a data resource and/or visual indicia 123, such as but not limited to standard barcodes, matrix barcodes (e.g., a two-dimensional barcode, QR code, etc.), printed alpha-numeric information, and/or other data resources. The data resource may include employee data such as, for example, employee personal information, employee safety records, employee testing records, employee training records, and/or employee work schedules. These data resources may be scanned, detected, or otherwise read by the client devices 104, 105, 106. In embodiments or aspects, a camera unit of the client devices 104, 105, 106 may be used to optically scan the visual data resources. The employee data may be used as at least a portion of the incident data that is collected by and transmitted from the client devices 104, 105, 106.

Figure 3:
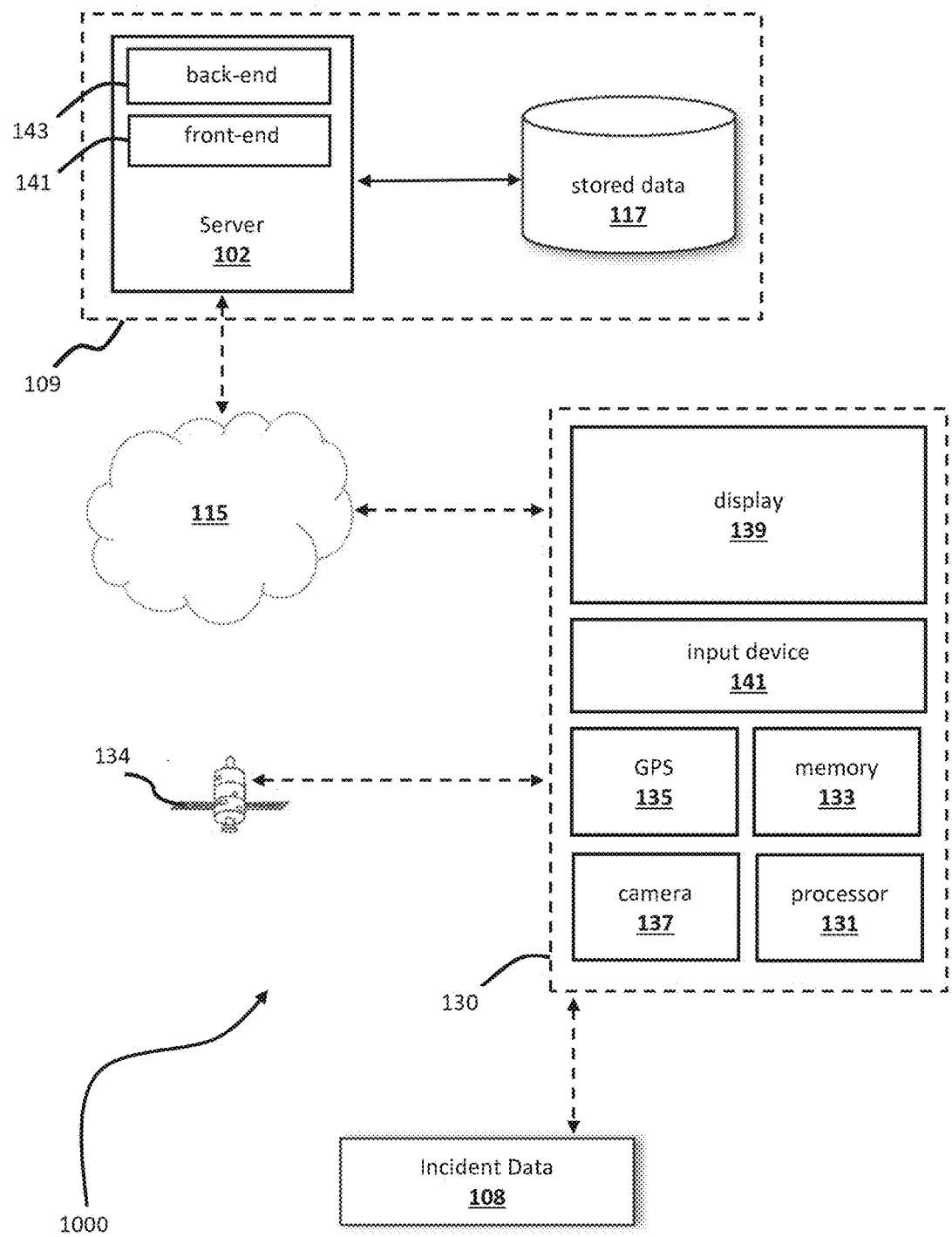
FIG. 3 is a further schematic view of one embodiment or aspect of an incident reporting and notification system according to the principles of the present invention.

Referring now to FIG. 3, an incident reporting and notification system 1000 is shown according to a further preferred and non-limiting embodiment or aspect. The server computer 102 may include a back-end component 143 and a front-end component 141, which respectively provide data management and data input services to the management computer 103 (not shown) and a client device 130. The host 109, including the server computer 102 and incident management database 117, provides services, such as the transfer, receipt, and processing of data, to the client device 130 and the management computer 103, as well as any other devices capable of receiving and/or transmitting data. The client device 130 may include various components and/or modules, such as but not limited to an input device 141, a display device 139, a Global Positioning System (GPS) receiver 135, a processor 131, a memory device 133, a camera or optical sensing device 137, and/or a microphone (not shown). A satellite 134 is in communication with the client device 130 to provide the client device 130 with geographic coordinates.

With continued reference to FIG. 3, in a preferred and non-limiting embodiment or aspect, the back-end component 143 provides the client device 130 with analyzed data. The analyzed data may include report data, graph data, map data, alert data, and/or stored data, as examples. The back-end component 143 receives incident data and stored data and generates the analyzed data. The analyzed data may be in the form of reports, graphs, emails, maps, short message service (SMS) text messages, alerts, notifications, and/or the like. The report data may include incident reports, fault determinations, comment reports, and/or the like. Graph data may include visual representations of incident data and/or stored data. Alert data may include an emergency alert, a location to avoid alert, an employee testing alert, an employee training alert, and/or the like.

Still referring to FIG. 3, in a preferred and non-limiting embodiment or aspect, a fault determination is generated by the back-end component 143. The fault determination is calculated by processing, based at least partially on at least one algorithm, at least a portion of the incident data and a portion of the stored data. It will be appreciated that other parameters may be used, such as for example sound level data, time of day, vehicle speed data, speed limit data, and/or the like. An algorithm assigns values to the incident data provided. The values may be weighted based on the type of information that the value is associated with (e.g., location of incident, person(s) involved in an incident, etc.). An algorithm may compare values with stored data entries (e.g., employee history, location history, incident history, etc.) and generate a fault determination that can be sent to the client device 130 as a part of a report. For example, a fault determination may be based on a determination that a vehicle was moving too fast given a speed limit in a particular location. As another example, a fault determination may be based at least partially on detection of a hard braking event in the vehicle.

Figure 4:
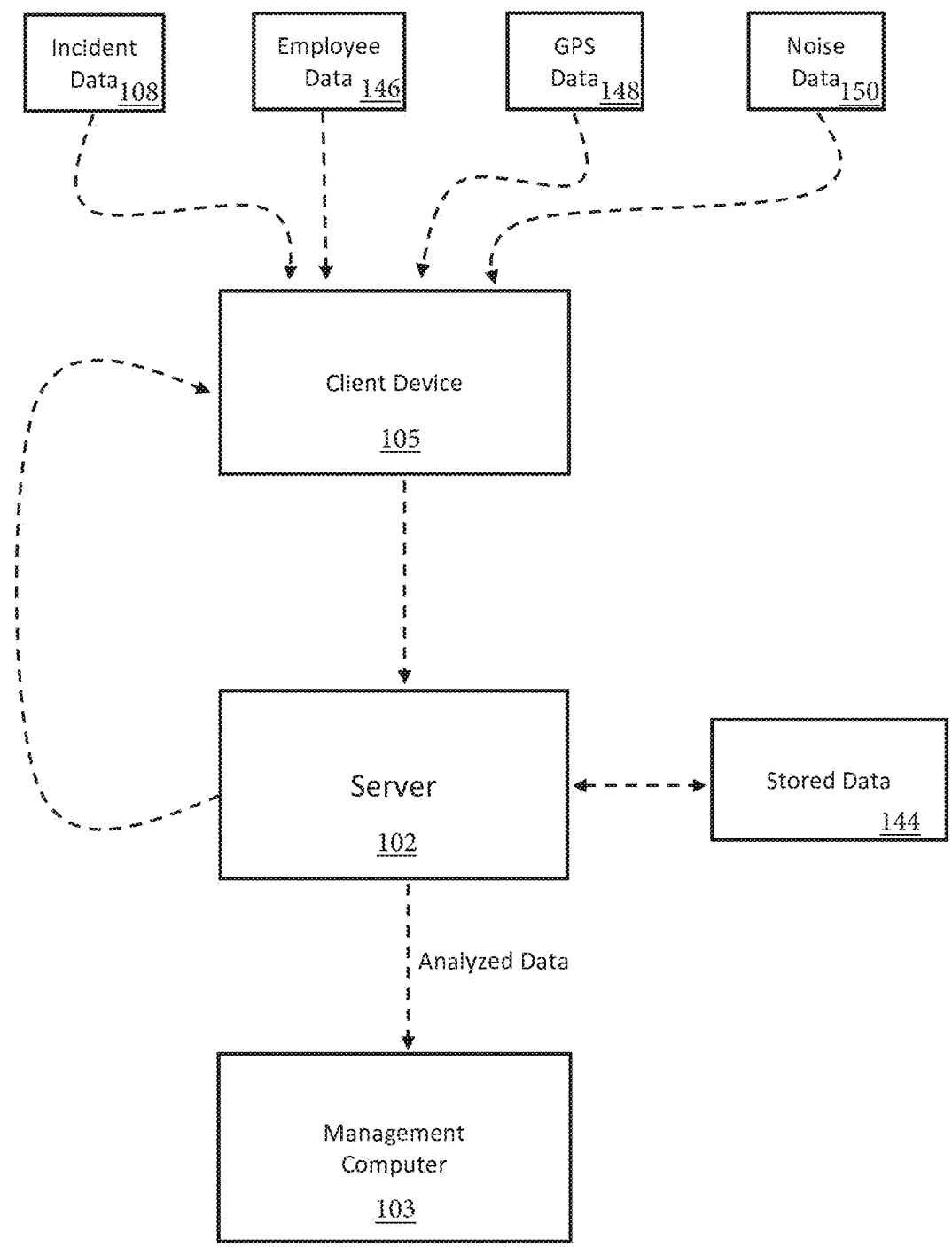
FIG. 4 is another schematic view of one embodiment or aspect of an incident reporting and notification system according to the principles of the present invention.

Referring now to FIG. 4, an incident reporting and notification system is shown according to a preferred and non-limiting embodiment. A server computer 102 is in communication with a client device 105, a management computer 103, and a data storage device 144. The client device 105 receives incident data 108, employee data 146, GPS data 148, and noise data 150. This data 108, 146, 148, 150 may be stored locally on the device 105 and transmitted to the server computer 102 at predetermined intervals. It will be appreciated that this data 108, 146, 148, 150 may also be transmitted to the server 102 as it is received. The data 108, 146, 148, 150 may then be stored on a data storage device 144 and accessed, through the server 102, with the management computer 103.

In a preferred and non-limiting embodiment or aspect, various graphical user interfaces (GUIs) are generated and provided to users. Users may be passive users, active users, administrative users, super administrative users (e.g., "superadmins"), and/or a combination of passive, active, and/or administrative users. In a non-limiting embodiment or aspect, active users may be provided with data entry interfaces, passive users may be provided with report generation interfaces, and administrators may be provided with report generation interfaces and further features for viewing and/or interacting with the incident management data. Superadmins may have extended privileges for modifying the interfaces, data types, parameters, and/or the like.

In a preferred and non-limiting embodiment or aspect, the client device may be programmed or configured to display a menu interface. The menu interface may include selectable options or buttons, such as but not limited to a form interface option, a map interface option, a report interface option, a user management interface option, a miscellaneous information interface option, and/or the like.

In a preferred and non-limiting embodiment or aspect, the client device is programmed or configured to display one or more form interfaces. A form interface may be configured to receive incident data and transmit that data to the server computer. The form interface may include, for example, selectable options that can be filled in manually or, in some instances, automatically. The selectable options may include, but are not limited to, fields, buttons, checkboxes, and/or menus to specify a location of an incident, time of an incident, description of an incident, parties involved in an incident, comments from a user filling out the incident form, comments from parties involved in an incident, and/or incident sound levels, as examples.

In a preferred and non-limiting embodiment or aspect, the client device 130 is programmed or configured to display a map interface. The map interface may be configured to receive map data from the server computer 102 or a third-party server. The map interface may include a map with a visual indication showing a current location of the client device. Additionally, the map interface may include a number of icons or other visual indications to identify locations of incidents, severity of incidents, descriptions of incidents, which areas (including sites) to avoid, and/or suggested route options. It will be appreciated that the map interface may be generated from various data sources and third-party services, such as but not limited to Google Maps, MapQuest, government databases, and/or the like. The map interface may include a two-dimensional rendering, a satellite image, and/or other graphics depicting an area.

In a preferred and non-limiting embodiment or aspect, the client device 130 is programmed or configured to display a reports interface. The reports interface may be configured to receive at least one report from the server computer 102. Reports may be based at least partially on incident data, stored data, graph data, map data, and/or the like. Graphs, charts, tables, and/or other visualizations may be generated to enable viewing and/or interaction with the data.

In a preferred and non-limiting embodiment or aspect, the client device 130 is programmed or configured to display an alert interface and receive alert data from the server computer 102. The alert data may include, but is not limited to, an emergency alert, a location to avoid alert, an employee testing alert, an employee training alert, and/or the like. In a preferred and non-limiting embodiment or aspect, the alerts are displayed in a manner that distinguishes the alert from the rest of the interface. For example, icons and audible sounds may be used for alerts, indications, markers, and/or the like so that drivers do not need to take their eyes off of the road and so that illiterate drivers are able to understand important information. Alerts may include, for example, push messages on a client device, emails, text messages, ringtones, and/or the like.

In a preferred and non-limiting embodiment or aspect, the client device 130 may be programmed or configured to display an information retrieval interface. The information retrieval interface may be configured to facilitate users to search stored data and may further facilitate users to review previous incidents or view guidelines and codes for managing a current incident.

In a preferred and non-limiting embodiment or aspect, the system is programmed or configured to operate when network connectivity is unavailable or variable. For example, the data communicated between the server 102 and client device 130 may be minimized and restricted to only predetermined types of information that are deemed necessary. Further, if a network connection is unavailable, the client device 130 may be programmed or configured to store the outgoing data locally and to periodically attempt to retransmit it to the server. When a connection becomes available, the client device 130 may transmit the stored data and receive incoming data from the server. The incoming data from the server 102 may be stored locally on the client device 130 in case the network connection is subsequently lost. Since location data is generally available from a GPS satellite, the loss of a network connection should not affect the determination of a location. However, it will be appreciated that location may be determined in various other ways.

In a preferred and non-limiting embodiment or aspect, the client device 130 may include a microphone and a speaker. The client device 130 may also be in communication with a stereo system or speaker in a vehicle. It will be appreciated that any of the text appearing on a GUI of the client device, in addition to other information, may be audibly annunciated through the speaker of the client device 130 or the user vehicle. Further, any user selection, option, or command may be input through spoken words or phrases received by a microphone of the client device and processed by the client device 130 and/or the server 102. In some non-limiting embodiments or aspects, the client device 130 may be programmed, configured, and/or adapted to limit or prevent user interaction at various stages or with certain GUIs to eliminate user error.

In a preferred and non-limiting embodiment or aspect, a volume level on the client device 130 may be monitored by an application running on the client device 130 or on the server 102. If the user lowers the volume of the client device 102, an alert may be generated and transmitted to the server 102. Additionally, the client device 130 may be programmed or configured to prevent modification of the volume level. This functionality can ensure that a user is provided with all the notifications and alerts necessary.

Referring now to FIG. 6, a safety report user interface 600 is shown according to a preferred and non-limiting embodiment or aspect. A call option 602 may be displayed that, upon selection, automatically initiates a telephone call to a specified destination or brings a user to a telephone interface for making the call. It will be appreciated that the call option 602 may be used to initiate cellular calls, voice-over-IP calls, text messages, and other forms of communication. An accident report option 604, an incident report option 606, and a near miss report option 608 are also displayed on the safety report user interface 600. The options 602, 604, 606, 608 may include, for example, one or more push buttons, radio buttons, items in a drop-down menu, and/or other like selectable options.

With continued reference to FIG. 6, pressing the accident report option 602 may cause the client device to display an accident report user interface 700, such as the preferred and non-limiting embodiment shown in FIG. 7. The accident report user interface 700 may include various selectable options and/or input fields to facilitate a user to input accident data. A location may be manually entered or a user may select a use location option 708 to use the current location of the client device as determined by GPS coordinates or other methods. An input field 702 may be used to input the name or identifier of the person preparing the report. Such a name may also be selected from a list, menu, or the like. One or more add picture options 704 may also be displayed, allowing users to choose image files to associate and/or upload with an accident report. The add picture option 704 may also present a camera application to capture images and/or video. Other input fields 706 or other selectable options may be used to input the name of a supervisor, safety coordinator, manager, and/or other individual that may be associated with an accident report.

Referring now to FIG. 8, a near miss report user interface 800 is shown according to a preferred and non-limiting embodiment or aspect. The near miss report user interface 800 is shown in response to a user selecting the near miss report option 608 shown on the safety report user interface 600 of FIG. 6. The near miss report user interface 800 may facilitate a user to indicate the severity of a "near miss" incident. For example, selectable options 804 for a level of severity from multiple options may be chosen to indicate that if the incident had actually occurred, the incident would have been of high severity (e.g., potentially fatal or resulting in permanent disability), medium severity (e.g., temporary disability, some pecuniary loss, etc.), or low severity (e.g., minor or no injury, no pecuniary loss, etc.). The near miss report user interface 800 may also inquire into potential physical injuries, equipment or property damage, and/or environmental impact. One or more questions or inquiries may be presented in the near miss report user interface 800. A location may be manually entered or a user may select the use location option 802 to use the current location of the client device as determined by GPS coordinates or other methods.

Referring now to FIG. 9, an incident report user interface 850 is shown according to a preferred and non-limiting embodiment or aspect. The incident report user interface 850 includes a number of selectable options and input fields for entering incident data concerning an incident. For example, a first option 854 inquires if the release of fluid or other materials happened within a specified distance (e.g., 100 feet) of a public road. Another option 856 inquires if the release of fluid or other materials happened within a specified distance (e.g., 100 feet) of a body of water (e.g., a perennial stream). Yet another option 858 may ask the user to specify the truck route, the truck origin, and/or the truck destination with an input field or other selectable options.

Again, a location may be manually entered or a user may select the use location option 852 to use the current location of the client device as determined by GPS coordinates or other methods.

In a preferred and non-limiting embodiment or aspect, an invoice user interface may be used to generate, transmit, approve, and/or manage invoices. The generation of invoice reports is described by U.S. patent application Ser. No. 14/095,043, filed Dec. 3, 2013, to Richie et al., the contents of which are hereby incorporated by reference in its entirety. Invoices may be automatically generated based on data that is collected during a truck route, retrieved from a third-party source, and/or inputted. For example, the scanning of barcodes, RFID tags, Bluetooth® transmitters, and/or other like devices may be used to generate an invoice. In such examples, a barcode, RFID, or other data carrier may be scanned to indicate a pick-up, a drop-off, or other events associated with a cost or other expenditure. An invoice database may then be populated with the costs or expenses incurred by a particular truck, route, driver, company, and/or the like.

Figure 10:
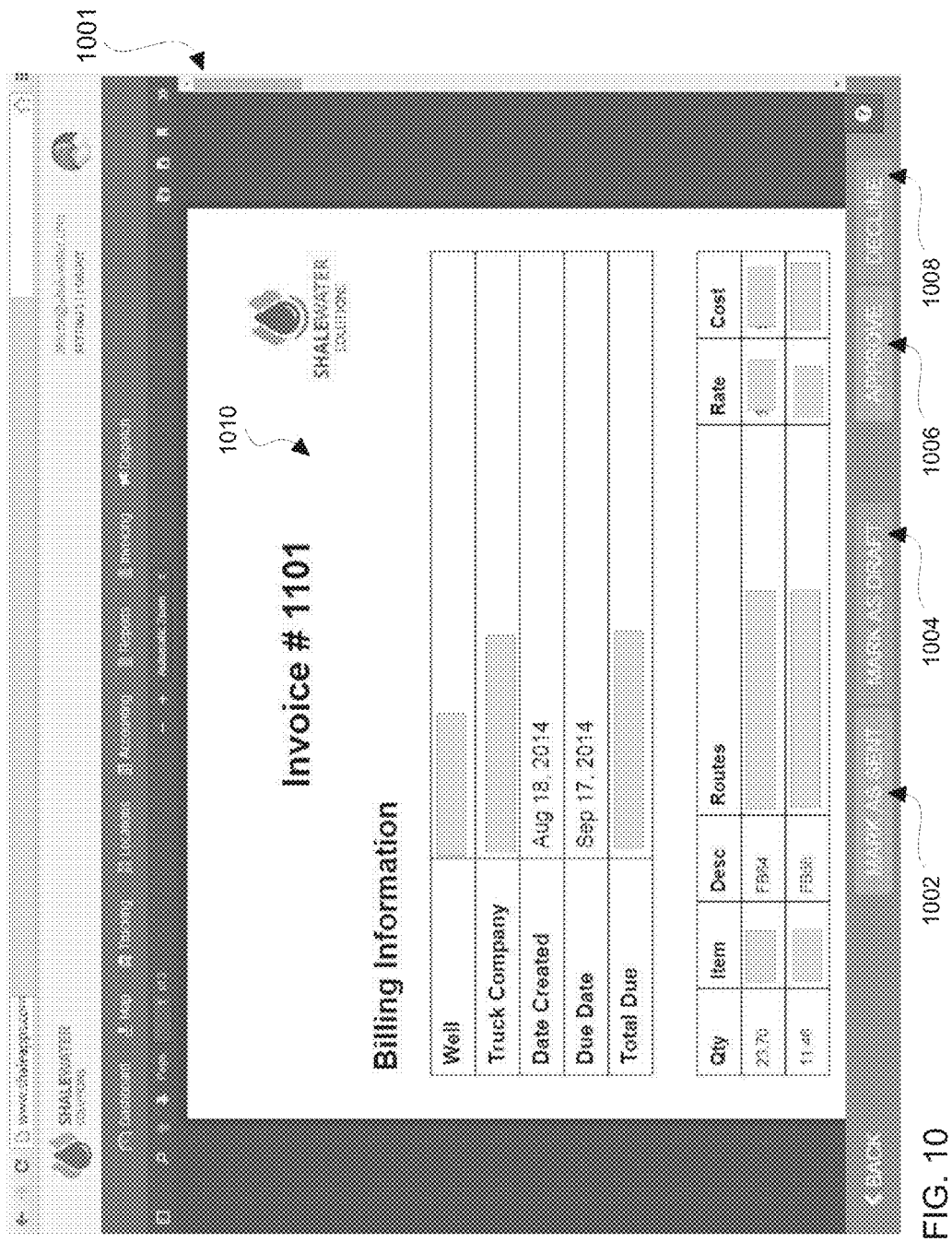
FIG. 10 depicts an invoice user interface according to the principles of the present invention.

Referring now to FIG. 10, an invoice user interface 1001 is shown according to a preferred and non-limiting embodiment or aspect. The invoice user interface 1001 includes an invoice document 1010. The invoice document 1010 may be in any number of forms, such as for example HTML, PDF, JPEG, TIFF, plaintext, Microsoft Word, Open Office, and/or the like. In the example shown in FIG. 10, the invoice document 1010 is a PDF embedded in a webpage for viewing. The invoice document 1010 includes various parameters for an invoice, including a well, truck company, date created, due date, total due, and the like. The invoice may also include line items for a haul such as quantity, item, description, routes, rate, cost, and/or the like. The invoice user interface 1001 includes a mark as sent option 1002, a mark as draft option 1004, an approve option 1006, and a decline option 1008. The mark as sent option 1002, when selected, indicates in a database that the invoice document 1010 has been sent to the customer. The mark as draft option 1004, when selected, saves the invoice document 1010 as a draft but does not cause the invoice document 1010 to be sent. Further, the invoice document 1010 may be sent to the customer automatically at regular intervals (e.g., weekly or monthly), at the end of a shift, or when all necessary data for a time period has been obtained. When a customer logs in to the system and views the invoice user interface 1001, they can approve of the invoice with the approve option 1006 or decline the invoice with the decline option 1008. Further, the customer may choose to comment on the invoice document 1010 instead of approving it or declining it, thus creating a dialogue between the payor and payee. In non-limiting embodiments or aspects, an automatic reminder may be sent to the customer if the invoice has not been approved and/or paid within a specified amount of time (e.g., 5 days).

In preferred and non-limiting embodiments or aspects, trucks and/or drivers may be dispatched by a manager or other individual. For example, a user may select a truck, a pick-up site, a drop-off site, and a start time for one or more drivers. At the start time for each dispatch, or at some predetermined time prior to the start time, a message may then be sent to the driver (e.g., via a push notification, text message, email, pop-up dialogue box, and/or the like). In this way, the material being picked up (e.g., type of fluid) and the pick-up and drop-off sites are already known and the driver does not have to input this information.

In preferred and non-limiting embodiments or aspects, and as further described in U.S. patent application Ser. No. 14/095,043 to Richie et al., route information is collected from vehicles as they transport material. For example, the specific turns, streets, and paths taken by the vehicles may be saved and associated with a day of the week and/or time of day. In this way, one or more algorithms may be used to determine the most common route for all times, the most common route for a particular time, and/or the like. In this way, drivers may be free to take any appropriate route to develop a database of route data that can be used to determine the most optimal route for time efficiency, cost efficiency, avoidance of certain areas, etc. Moreover, the route data may include traffic data that indicates when a particular route or portion thereof may experience high traffic and delayed transportation. Once a route database is developed, the system can then detect if a vehicle is off course from one of multiple possible routes and alert the driver that he or she is off course. Analytics may also be presented in real-time, allowing administrators, managers, and/or other individuals to view a progress of one or more vehicles closing in on their destinations. For example, a progress bar may represent the progress of one or more vehicles.

In a preferred and non-limiting embodiment or aspect, accidents, incidents, and/or near misses may be verified and investigated with a route replay option. The route replay option may allow for a user to visualize the route of one or more vehicles over a time period. For example, a replay option may be provided on an electronic report, a web interface, and/or a mobile interface. As a vehicle moves, a visual track may be generated on a map over the route the vehicle takes. Any event or other log generated by the vehicle may be represented on the map with pins or other indicators. For example, if the vehicle enters or exits a geofence, a pin may be generated for the location and the time that the event occurred. The speed of a vehicle may be determined from the time it takes for the vehicle to traverse a distance. By frequently obtaining the vehicle location information, the accuracy of the vehicle speed can be improved over methods in which the vehicle location is obtained at regular, spaced intervals. In this manner, an accident, incident, and/or near miss may be investigated by replaying the vehicle route and determining the speed of the vehicle in a given area or at a specific time. The accident, incident, and/or near miss may also be visualized on the map with a pin or some other indicator.

Figure 11:
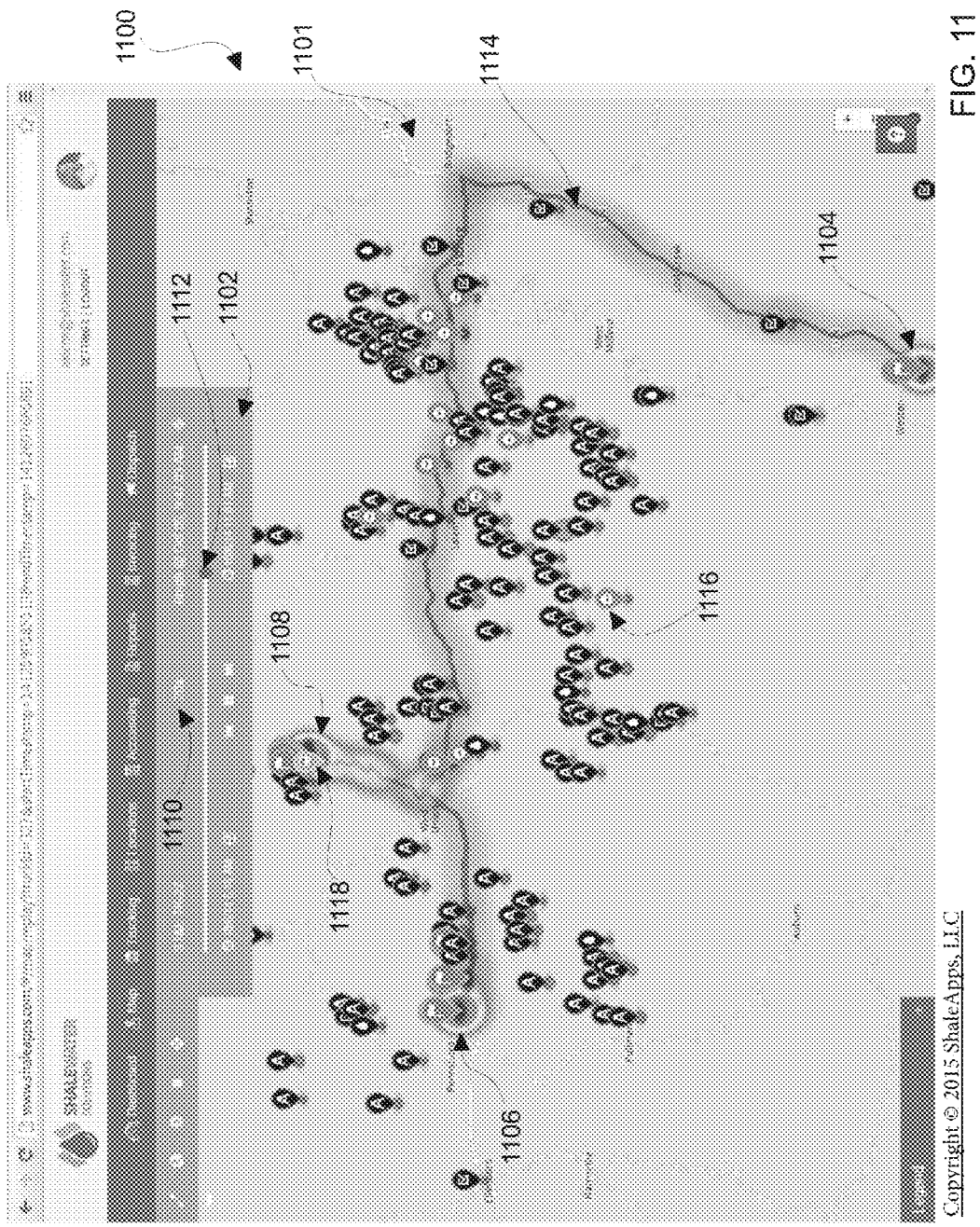
FIG. 11 depicts a replay user interface according to the principles of the present invention.

Referring now to FIG. 11, a replay user interface 1100 is shown according to a preferred and non-limiting embodiment. The replay user interface 1100 includes a map 1101 that depicts a route for one or more vehicles. A replay menu 1102 is displayed on the replay user interface 1100 and includes various selectable options to control a visual replay of route 1114 taken by one or more vehicles. As shown in FIG. 11, the route 1114 is color coded to indicate one or more route parameters. In the illustrated example, the route 1114 is color coded based on the frequency of waypoints at which the location of the vehicle is recorded. For example, a dark blue color may indicate a portion of the route 1114 in which the vehicle was moving and therefore the waypoints are spread out. At the sites, or when the vehicle is moving slow due to traffic or other reasons, the color becomes increasingly red on a spectrum of blue to red (e.g., a heat map). The replay menu 1102 may include a timeline 1112 and a replay speed 1110, as well as other selectable options for controlling the replay of one or more vehicle routes. In the illustrated example, the replay is 20× actual speed. The time of day and/or date corresponding to the vehicle position on the timeline 1112 may also be displayed on the replay menu 1102.

With continued reference to FIG. 11, icons 1116, 1118 are shown on the map to represent vehicles, employees, withdrawal sites, wells/pads, restricted areas or sites, speed traps, check points, treatment centers, disposal wells, and/or the like. The icons 1116, 1118 may be color coded. For example, a truck icon 1118 may be yellow to indicate that the truck is carrying production water, light blue to indicate fresh water, dark blue to indicate treated water, brown to indicate flowback water, gray to indicate an empty truck, and/or the like. It will be appreciated that various other color schemes and/or indicators may be used. The icons may also display a pop-up window (not shown) in response to clicking the icon or moving a cursor over the icon. The pop-up window may provide further information concerning the truck, site, or restriction.

Figure 12:
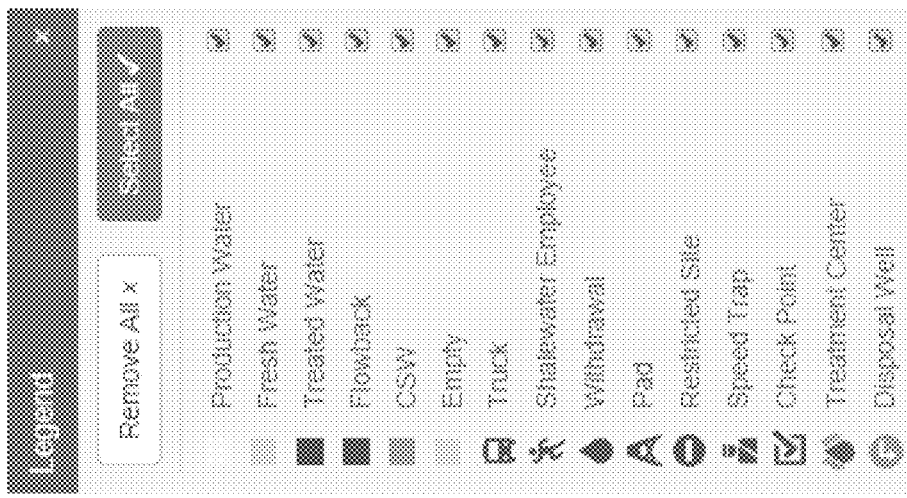
FIG. 12 depicts a legend for the replay user interface shown in FIG. 11 according to the principles of the present invention.

With continued reference to FIG. 11, selectable options may be presented to generate a replay user interface 1100 for a particular truck based on one or more parameters. For example, if an accident occurs and is logged at a particular location, a user may choose selectable options to generate a replay user interface for the trucks that passed within a certain range of the accident. It will be appreciated that various other parameters may be used to generate a replay user interface 1100. FIG. 12 shows a legend for the interface 1100 shown in FIG. 11 according to a preferred and non-limiting embodiment or aspect.

Figure 5:
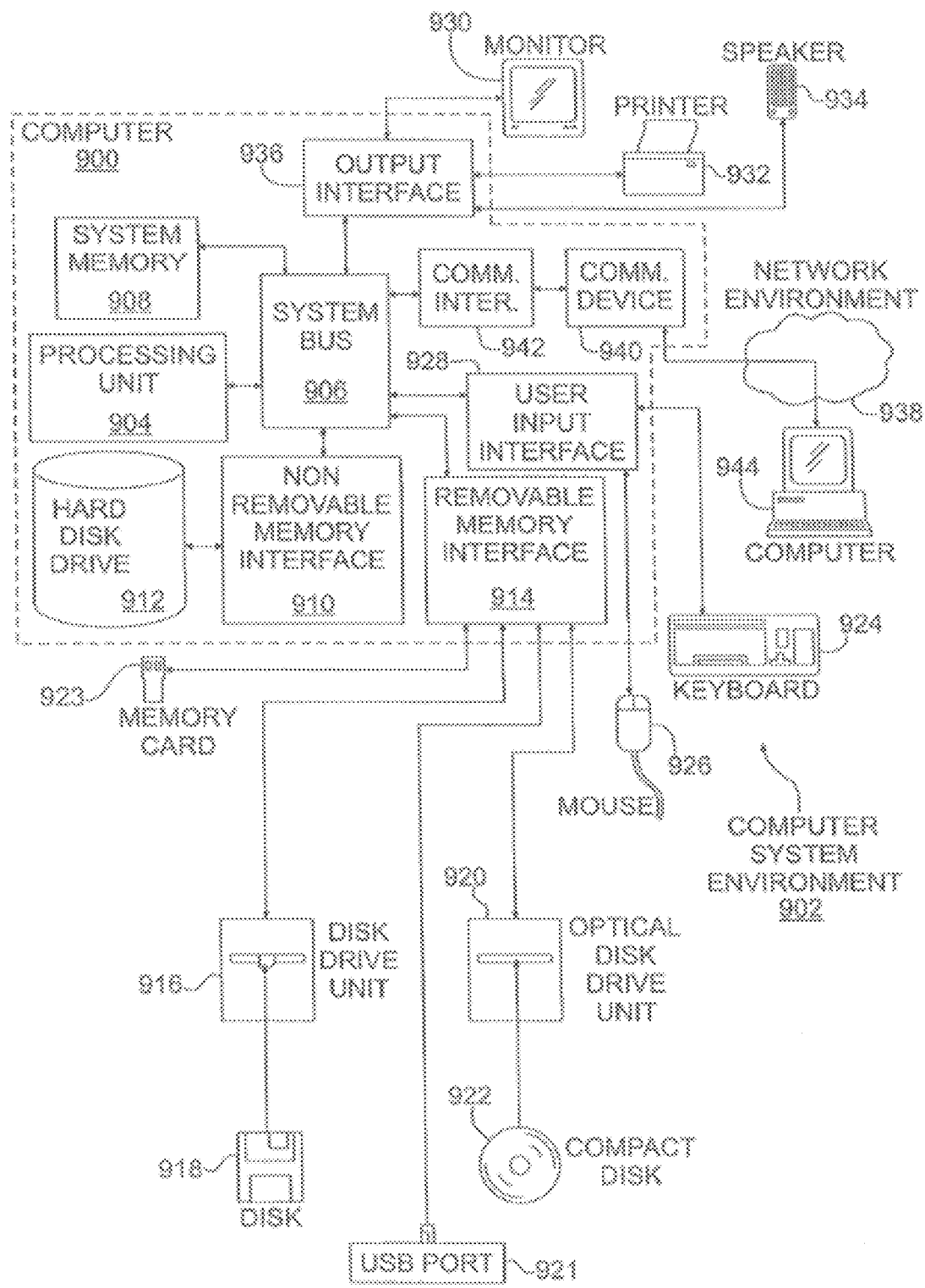
FIG. 5 depicts a diagram of a computer environment according to the prior art.

The present invention may be implemented on a variety of computing devices and systems, including the client devices and/or server computers, wherein these computing devices include the appropriate processing mechanisms and computer-readable media for storing and executing computer-readable instructions, such as programming instructions, code, and the like. As shown in FIG. 5, personal computers 900, 944, in a computing system environment 902 are provided. This computing system environment 902 may include, but is not limited to, at least one computer 900 having certain components for appropriate operation, execution of code, and creation and communication of data. For example, the computer 900 includes a processing unit 904 (typically referred to as a central processing unit or CPU) that serves to execute computer-based instructions received in the appropriate data form and format. Further, this processing unit 904 may be in the form of multiple processors executing code in series, in parallel, or in any other manner for appropriate implementation of the computer-based instructions.

In order to facilitate appropriate data communication and processing information between the various components of the computer 900, a system bus 906 is utilized. The system bus 906 may be any of several types of bus structures, including a memory bus or memory controller, a peripheral bus, or a local bus using any of a variety of bus architectures. In particular, the system bus 906 facilitates data and information communication between the various components (whether internal or external to the computer 900) through a variety of interfaces, as discussed hereinafter.

The computer 900 may include a variety of discrete computer-readable media components. For example, this computer-readable media may include any media that can be accessed by the computer 900, such as volatile media, non-volatile media, removable media, non-removable media, etc. As a further example, this computer-readable media may include computer storage media, such as media implemented in any method or technology for storage of information, such as computer-readable instructions, data structures, program modules, or other data, random access memory (RAM), read only memory (ROM), electrically erasable programmable read only memory (EEPROM), flash memory, or other memory technology, CD-ROM, digital versatile disks (DVDs), or other optical disk storage, magnetic cassettes, magnetic tape, magnetic disk storage, or other magnetic storage devices, or any other medium which can be used to store the desired information and which can be accessed by the computer 900. Further, this computer-readable media may include communications media, such as computer-readable instructions, data structures, program modules, or other data in other transport mechanisms and include any information delivery media, wired media (such as a wired network and a direct-wired connection), and wireless media. Computer-readable media may include all machine-readable media with the sole exception of transitory, propagating signals. Of course, combinations of any of the above should also be included within the scope of computer-readable media.

The computer 900 further includes a system memory 908 with computer storage media in the form of volatile and non-volatile memory, such as ROM and RAM. A basic input/output system (BIOS) with appropriate computer-based routines assists in transferring information between components within the computer 900 and is normally stored in ROM. The RAM portion of the system memory typically contains data and program modules that are immediately accessible to or presently being operated on by processing unit 904, e.g., an operating system, application programming interfaces, application programs, program modules, program data, and other instruction-based computer-readable codes.

With continued reference to FIG. 5, the computer 900 may also include other removable or non-removable, volatile or non-volatile computer storage media products. For example, the computer 900 may include a non-removable memory interface 910 that communicates with and controls a hard disk drive 912, i.e., a non-removable, non-volatile magnetic medium; and a removable, non-volatile memory interface 914 that communicates with and controls a magnetic disk drive unit 916 (which reads from and writes to a removable, non-volatile magnetic disk 918), an optical disk drive unit 920 (which reads from and writes to a removable, non-volatile optical disk 922, such as a CD ROM), a Universal Serial Bus (USB) port 921 for use in connection with a removable memory card, etc. However, it is envisioned that other removable or non-removable, volatile or non-volatile computer storage media can be used in the exemplary computing system environment 900, including, but not limited to, magnetic tape cassettes, DVDs, digital video tape, solid state RAM, solid state ROM, etc. These various removable or non-removable, volatile or non-volatile magnetic media are in communication with the processing unit 904 and other components of the computer 900 via the system bus 906. The drives and their associated computer storage media discussed above and illustrated in FIG. 5 provide storage of operating systems, computer-readable instructions, application programs, data structures, program modules, program data, and other instruction-based computer-readable code for the computer 900 (whether duplicative or not of this information and data in the system memory 908).

A user may enter commands, information, and data into the computer 900 through certain attachable or operable input devices, such as a keyboard 924, a mouse 926, etc., via a user input interface. Of course, a variety of such input devices may be utilized, e.g., a microphone, a trackball, a joystick, a touchpad, a touch-screen, a scanner, etc., including any arrangement that facilitates the input of data, and information to the computer 900 from an outside source. As discussed, these and other input devices are often connected to the processing unit 904 through the user input interface 928 coupled to the system bus 906, but may be connected by other interface and bus structures, such as a parallel port, game port, or a universal serial bus (USB). Still further, data and information can be presented or provided to a user in an intelligible form or format through certain output devices, such as a monitor 930 (to visually display this information and data in electronic form), a printer 932 (to physically display this information and data in print form), a speaker 934 (to audibly present this information and data in audible form), etc. All of these devices are in communication with the computer 900 through an output interface 936 coupled to the system bus 906. It is envisioned that any such peripheral output devices be used to provide information and data to the user.

The computer 900 may operate in a network environment 938 through the use of a communications device 940, which is integral to the computer or remote therefrom. This communications device 940 is operable by and in communication to the other components of the computer 900 through a communications interface 942. Using such an arrangement, the computer 900 may connect with or otherwise communicate with one or more remote computers, such as a remote computer 944, which may be a personal computer, a server, a router, a network personal computer, a peer device, or other common network nodes, and typically includes many or all of the components described above in connection with the computer 900. Using appropriate communication devices 940, e.g., a modem, a network interface or adapter, etc., the computer 900 may operate within and communication through a local area network (LAN) and a wide area network (WAN), but may also include other networks such as a virtual private network (VPN), an office network, an enterprise network, an intranet, the Internet, etc. It will be appreciated that the network connections shown are exemplary and other means of establishing a communications link between the computers 900, 944 may be used.

As used herein, the computer 900 includes or is operable to execute appropriate custom-designed or conventional software to perform and implement the processing steps of the method and system of the present invention, thereby, forming a specialized and particular computing system. Accordingly, the presently-invented method and system may include one or more computers 900 or similar computing devices having a computer-readable storage medium capable of storing computer-readable program code or instructions that cause the processing unit 902 to execute, configure, or otherwise implement the methods, processes, and transformational data manipulations discussed hereinafter in connection with the present invention. Still further, the computer 900 may be in the form of a personal computer, a personal digital assistant, a portable computer, a laptop, a palmtop, a mobile device, a mobile telephone, a server, or any other type of computing device having the necessary processing hardware to appropriately process data to effectively implement the presently-invented computer-implemented method and system.

Although the invention has been described in detail for the purpose of illustration based on what is currently considered to be the most practical and preferred embodiments or aspects, it is to be understood that such detail is solely for that purpose and that the invention is not limited to the disclosed embodiments or aspects, but, on the contrary, is intended to cover modifications and equivalent arrangements that are within the spirit and scope of the appended claims. For example, it is to be understood that the present invention contemplates that, to the extent possible, one or more features of any embodiment or aspect can be combined with one or more features of any other embodiment or aspect.

The invention claimed is:

1. An incident reporting system, comprising:
 (a) at least one client device comprising at least one processor, a camera unit, and a microphone, the at least one client device programmed or configured to:
  (i) generate location data for the at least one client device while the at least one client device is in a moving transportation vehicle, the location data comprising waypoint data representing a location of the moving transportation vehicle;
  (ii) generate at least one user interface configured to receive incident data from at least one of the client device and a user of the client device, the incident data comprising at least one of the following: a location of an incident, a time of occurrence of an incident, a textual description of an incident, a party involved in an incident, or any combination thereof; and
  (iii) capture and store at least one image of an incident with the camera unit;
 (b) at least one server computer in communication with the at least one client device and programmed or configured to:
  (i) receive the location data, the incident data, and the at least one image from the at least one client device;
  (ii) generate at least one report based at least partially on the incident data and at least one of the following: the location data, the at least one image, or any combination thereof; and (iii) generate a replay user interface based on the waypoint data received from the at least one client device over a period of time, the replay user interface comprising a route of the moving transportation vehicle displayed on a map.

2. The incident reporting system of claim 1, wherein the at least one client device is further programmed or configured to automatically capture and store noise data with the microphone while the at least one client device is in the moving transportation vehicle, and wherein the noise data comprises decibel levels.

3. The incident reporting system of claim 1, wherein the noise data is recorded as A-weighted decibels (dBA).

4. The incident reporting system of claim 1, further comprising at least one employee data resource located on an employee identification card, the employee data resource comprising employee data including at least one of the following: employee personal information, employee work schedule, employee safety records, employee testing records, employee training records, or any combination thereof.

5. The incident reporting system of claim 4, wherein the at least one client device is further programmed or configured to scan the at least one employee data resource to obtain the employee data, and transmit the employee data to the at least one server computer.

6. The incident reporting system of claim 5, wherein the at least one employee data resource comprises at least one of a barcode and an RFID transponder.

7. The incident reporting system of claim 1, wherein the at least one server computer and/or the at least one client device is programmed or configured to determine an assignment of fault for the incident to at least one party of a plurality of parties involved in the incident based at least partially on at least one algorithm and the incident data.

8. The incident reporting system of claim 1, wherein the at least one client device is further programmed or configured to display a map interface, and receive map data from the at least one server computer, the map data comprising at least one of the following: a pin displaying the location of an incident, an icon displaying the severity of the incident, a brief description of the incident, suggested route options, or any combination thereof.

9. The incident reporting system of claim 1, wherein the at least one client device is further programmed or configured to display an alert interface and receive alert data from the at least one server computer, the alert data comprising at least one of the following: emergency alert, location to avoid alert, employee testing alert, employee training alert, or any combination thereof.

10. The incident reporting system of claim 1, wherein the at least one server computer and/or the at least one client device is programmed or configured to:
determine an output volume level of the at least one client device; and
generate an alert or notification if the output volume level is below a predetermined threshold.

11. The incident reporting system of claim 1, wherein the route of the at least one client device is color coded based at least partially on a spacing of location waypoints recorded by the at least one server computer, such that portions of the route where location waypoints are spaced at a first distance are color coded differently than portions of the route where location waypoints are spaced at a second distance closer than the first distance.

12. The incident reporting system of claim 11, wherein the replay user interface comprises at least one selectable option configured to control a visual replay of the route taken by the at least one client device.

13. A computer-implemented method for incident reporting and notification, comprising:
providing a client device in each vehicle of a plurality of vehicles transporting a material;
generating, by at least one client device located in a vehicle of the plurality of vehicles, waypoint data representing a location of the vehicle;
transmitting the waypoint data from the at least one client device to at least one server computer at predetermined intervals;
generating, by the at least one server computer, a replay user interface based on the waypoint data received from the at least one client device over a period of time, the replay user interface comprising a route of the vehicle displayed on a map;
generating, on the at least one client device, at least one incident reporting interface configured to receive incident data from at least one of the client device and a user of the client device, the incident data comprising at least one of the following: a location of an incident, a time of occurrence of an incident, a textual description of an incident, a party involved in an incident, or any combination thereof;
capturing at least one image of an incident with a camera unit of the at least one client device;
associating the at least one image with the incident data; and
transmitting the incident data, the at least one image, and noise data from the at least one client device to the at least one server computer.

14. The computer-implemented method of claim 13, further comprising:
capturing, with at least one microphone while the vehicle is being operated, noise data; and
transmitting the noise data from the at least one client device to the at least one server computer.

15. The computer-implemented method of claim 14, wherein the noise data comprises sound levels for ambient noise occurring during operation of the vehicle.

16. The computer-implemented method of claim 13, further comprising: generating a color coded route based at least partially on a distance between waypoints reported by the at least one client device, such that portions of the route where waypoints are spaced at a first distance are color coded differently than portions of the route where waypoints are spaced at a second distance closer than the first distance.

17. The computer-implemented method of claim 13, further comprising: generating a visually animated replay of the route traveled by the vehicle on the replay interface.

18. The computer-implemented method of claim 13, further comprising generating, with the at least one server computer, at least one report based at least partially on the incident data and the waypoint data.

19. A computer program product for reporting incidents experienced by a vehicle transporting a material, the computer program product comprising at least one non-transitory medium including program instructions that, when executed by a mobile device, cause the mobile device to:
generate waypoint data representing a location of the vehicle at predetermined time intervals;
transmit the waypoint data to at least one server computer;
generate at least one incident reporting interface configured to receive incident data from at least one of the client device and a user of the client device, the incident data comprising at least one of the following: a location of an incident, a time of occurrence of an incident, a textual description of an incident, a party involved in an incident, or any combination thereof;
capture at least one image of an incident with a camera unit of the client device;
associate the at least one image with the incident data;
transmit the incident data and the at least one image from the at least one client device to the at least one server computer;
determine a volume level of an audible output of the client device;
determine if the volume level is below a predefined threshold; and
in response to determining that the volume level is below the predefined threshold, generating at least one alert.

* * * * *

UNITED STATES PATENT AND TRADEMARK OFFICE
CERTIFICATE OF CORRECTION

PATENT NO. : 10,095,998 B2
APPLICATION NO. : 14/950176
DATED : October 9, 2018
INVENTOR(S) : James Chance Richie et al.

It is certified that error appears in the above-identified patent and that said Letters Patent is hereby corrected as shown below:

In the Claims

Column 16, Line 48, Claim 3, delete "claim 1," and insert -- claim 2, --

Column 17, Line 35, Claim 12, delete "claim 11," and insert -- claim 1, --

Signed and Sealed this
Fifteenth Day of January, 2019

Andrei Iancu
*Director of the United States Patent and Trademark Office*